United States Patent [19]

Gilberts

[11] 4,013,927

[45] Mar. 22, 1977

[54] SURGE ARRESTER

[75] Inventor: Alexander George Gilberts, Algonquin, Ill.

[73] Assignee: Reliable Electric Company, Franklin Park, Ill.

[22] Filed: Sept. 18, 1975

[21] Appl. No.: 614,742

[52] U.S. Cl. ............................... 361/119; 313/217; 315/36

[51] Int. Cl.² ....................... H02H 1/04; H02H 3/22

[58] Field of Search ............. 317/61; 313/209, 217; 315/36

[56] References Cited

UNITED STATES PATENTS

| | | | |
|---|---|---|---|
| 1,765,531 | 6/1930 | Howard et al. | 317/61 X |
| 3,703,665 | 11/1972 | Yereance | 317/61 |

*Primary Examiner*—Harry Moose

*Attorney, Agent, or Firm*—Olson, Trexler, Wolters, Bushnell & Fosse, Ltd.

[57] ABSTRACT

A surge arrester for protecting telephone lines and the like from overvoltage has opposed carbon electrodes separated by an insulating spacer that houses one of the electrodes and provides a means for spacing the electrodes to define the arc gap therebetween. The other electrode has one round plateau with a flat end surface that defines one side of the gap. The plateau is surrounded by a valley structure which provides a maximum of relief or cavity space for carbon particles that erupt from the electrodes during discharge. The cavity space is used for venting erupted particles across the end of the spacer and thereby provides an increase in the surge life of the arrester.

6 Claims, 4 Drawing Figures

SURGE ARRESTER

BACKGROUND OF THE INVENTION

This invention relates to improvements in surge arresters of the type used for protecting telephone lines and other communication lines from overvoltage conditions.

One type of overvoltage or surge arrester used for protecting telephone lines comprises a housing that contains a pair of spaced carbon electrodes that define an arc or spark gap for grounding excessive line voltages so as to protect both equipment on the line and the line itself. In general the electrodes have opposed flat surfaces that define the arc gap. With repeated overvoltage conditions and discharges, carbon particles tend to erupt from the electrode surfaces. These particles sometimes become lodged between the electrodes causing a "noisy" line or even a complete grounding of the line.

In the design of surge arresters of the foregoing type a compromise is required between adequate surge life (i.e., number of firings) and acceptably low breakdown voltage. Thus, the arc gap can be widened to reduce the possibility of failure due to the presence of lodged carbon particles resulting from eruptions during firing. This will, of course, increase the surge life of the arrester. However, widening the arc gap may increase the breakdown voltage of the unit beyond acceptable standards.

The idea of providing a plurality of rectangular plateaus and grooves in the faces of the carbon electrodes for permitting erupted particles to be blown away from the arc gap is generally known from United States patents to DeKhotinsky 571,699 dated Nov. 17, 1896 and Yearance et al 3,703,665 dated Nov. 21, 1972. However, for a given size of electrodes it is believed that, in accordance with this invention, there should be only a single surface for arc discharge and a recess or valley area for receiving the erupted carbon particles, which recess area completely surrounds the single surface.

OBJECTS AND SUMMARY OF THE INVENTION

An object of this invention is to provide a surge arrester of a general type stated having a single projection or plateau on one of the electrodes, the plateau or projection being completely surrounded by a recess or valley, and wherein the valley is so related geometrically to the plateau that the surge life of the unit is improved while maintaining the voltage breakdown of the unit within acceptable limits.

A further object of this invention is to provide an electrode of the type stated that may be substituted for a conventional electrode in arresters (e.g. station protectors, central office equipment protectors) of the type currently being manufactured for use in the telephone industry.

A still further and important object of this invention is to provide an electrode of the general type stated in which the single plateau is symmetrically about the central axis of the electrode to provide, for a given size electrode, a large recess area and yet which maintains an adequate surface area for arc discharge.

In accordance with the objects of this invention the surge arrester is of the type that comprises a housing, a pair of spaced electrodes, insulating means surrounding a first of said electrodes and with a transverse end of said first electrode being recessed within the insulating means. The second of the electrodes has a transverse end seated on the insulating means and presented toward the first electrode, whereby an arc gap is provided that is determined by the extent of the recess of the first electrode within the insulating means. Also provided are means for retaining the electrodes and the insulating means in the housing. The invention is further characterized by the second electrode having valley structure in its transverse end that opens towards the first electrode and with a single plateau only projecting from the floor of the valley structure. The end surface of the plateau is flat and forms one side of the arc gap. The end surface is symmetrical relative to the central axis of the second electrode and the single plateau is entirely surrounded by valley structure.

In a more specific form of the invention the valley structure has a first pair of walls that are on opposite sides of the end surface and which slope away therefrom toward the floor of the valley structure. The valley structure further comprises a second pair of walls that are on opposite sides of and spaced from said end surface. The second pair of walls are circumferentially intermediate the first pair of walls. The second electrode also has opposed flats axially spaced from said end surface and being joined respectively to the second pair of walls to form obtuse angles therebetween. The valley structure together with the second pair of walls and the flats constitute a region that surrounds the plateau and provides a vent across the end of the insulating means for particles that erupt from the electrodes into the arc gap.

DETAILED DESCRIPTION

Figure 1:
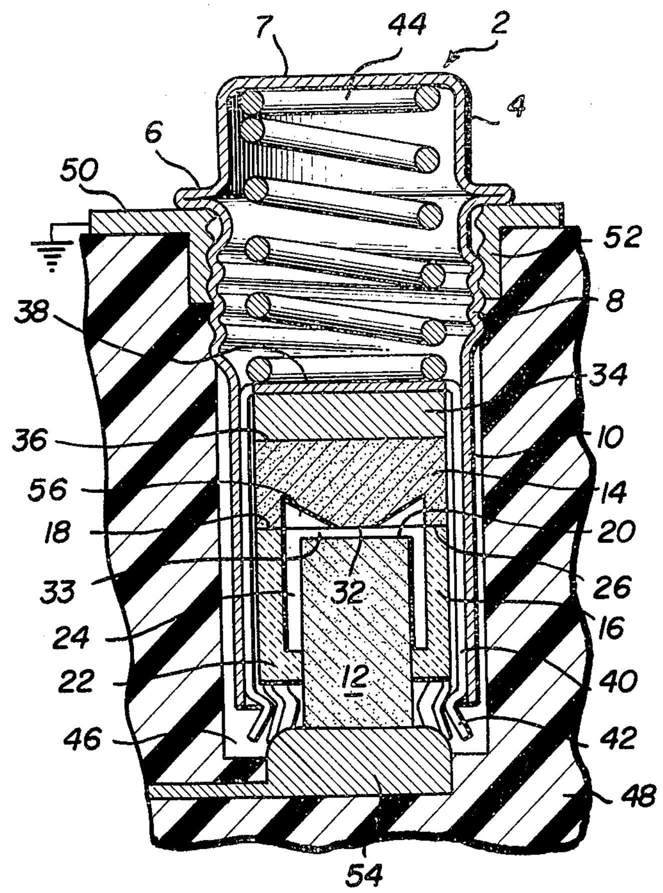
FIG. 1 is a sectional view taken through the central axis of one type of arrester embodying the present invention.

Referring now in more detail to the drawing there is shown one type of protector 2 embodying the invention and comprising a sheet metal housing or cap 4 having an annular radial flange 6 that is axially spaced from the end wall 7 of the cap 4. The cap 4 has a cylindrical wall that is formed with a thread 8 and a depending cylindrical skirt 10 adjacent to and extending axially from the thread 8. The skirt 10 terminates in an open end of the cap.

Mounted within the cap 4 is an electrode assembly that includes spaced generally cylindrical first and second carbon electrodes 12,14. The first electrode 12 is bonded to and is surrounded by a ceramic or like insulator 16 having its upper flat end face 18 spaced from the upper flat transverse end 20 of the electrode 12, whereby the end 20 is recessed within the insulator 16. It will be noted that the electrode 12 is bonded by a suitable adhesive to the insulator 16 at one end 22 thereof such that the electrode 12 projects outwardly beyond the open end of the cap 4. Furthermore, the diameter of the electrode 12 is somewhat less than the diameter of the insulator 16 remote from the end 22, whereby an annular space 24 is provided between the electrode 12 and the inner wall of the insulator 16.

The second electrode 14 has a transverse end that faces the transverse end 20 of the electrode 12. This transverse end of the electrode 14 comprises supporting ridges 26,26 that are diametrically opposed and are of sufficient arcuate extent and radial extent to provide adequate support for the electrode 14 on the end face 18 of the insulator 16. Centrally of the electrode 14 and symmetrical with its central axis 28 is a raised plateau 30 having a circular end surface 32 that is centered on the axis 28. The plane of the surface 32 and the planer surfaces of the ridges 26,26 all coincide. Consequently, the seating of the ridges 26,26 on the end face 18 provides an arc gap 33 that is determined by the extent of the recess of the first electrode 12 within the insulator 16. A solder pellet 34 in the form of a cylindrical metal disc is disposed against the flat base 36 of the second electrode 14, which flat base 36 is opposite to the ridges 26,26 and end surface 32. The disc 34, the electrodes 12,14 and the insulator 16 are held within the cap 4 by the resilient, generally cup-shaped cage 38. The cage has a number of circumferentially spaced spring fingers 40 which are compressed radially inwardly when the cage is inserted within the tubular skirt 10. The lower end of each finger 40 has an inwardly formed V-tip 42 such that the tips 42 confine and retain the components of the arrester within the cage 38. Thus, the disc 34, the electrodes 12,14 and the insulator 16 may be positioned within the cage, whereupon the cage and those parts assembled therewith may be axially inserted as a unit into the skirt 10. A coil compression spring 44 bears at one end on the end wall 7 of the cap 4 and at its other end against the flat, disc-like end of the cage 38.

The protector 2 is adapted to be monted in the well 46 of a dielectric block 48. At the upper end of the well 46 is a metallic contact plate 50 having an internally threaded annular flange 52 for receiving the cap thread 8. The plastic material of the block below the flange 52 is also threaded for some distance so that the cap may be threaded into the well 46 until the flange 6 abuts the contact plate 50. At the bottom of the well 46 is a metallic contact button 54 that is adapted to engage the electrode 12. The reaction force of the compressed spring 44 maintains the electrode 12 firmly against the contact button 54. The contact plate 50 and the contact button 54 may be suitably connected to binding posts or other terminals so that the plate 50 may be grounded and the contact button 54 connected to a telephone line to be protected, or vice-versa. The arrester and block arrangement shown in FIG. 1 may have any orientation. Thus, the arc gap 33 may be either horizontal or vertical or somewhere therebetween. In addition, the electrode assembly made up of the electrodes 12,14 and the insulator 16 may be embodied into other types of protectors, for example those central office equipment protectors of the type shown in United States Patent to Baumbach 3,794,947, issued Feb. 26, 1974.

It will be apparent that when a voltage appears on the line to be protected that exceeds the breakdown voltage of the unit there will be an arc across the gap 33 causing current to flow from the line to ground. The unit is self-restoring and so nothing need be done to place the unit in condition for repeated surges or arcs across the gap 33 as a result of subsequent overvoltage conditions. However, repeated surges may cause surface eruptions from the electrodes which might tend to reduce the surge life of the unit. For this reason the present invention provides an improved configuration of the electrode 14 as part of the electrode assembly.

Figure 2:
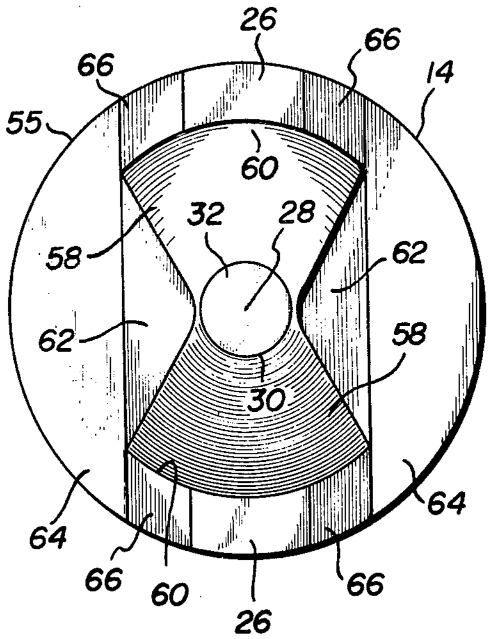
FIG. 2 is a top plan view on an enlarged scale of the improved electrode which forms a part of the present invention.
Figure 3:
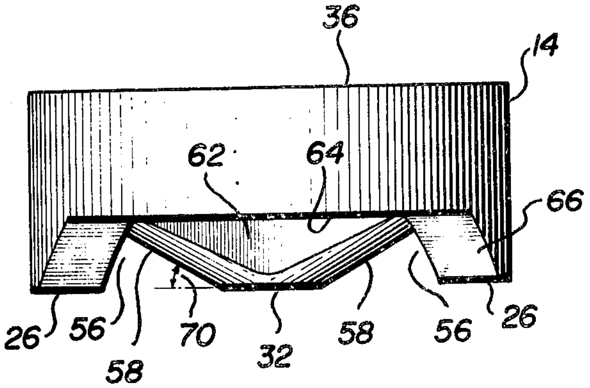
FIG. 3 is a side elevational view of the electrode as viewed from the left hand side of FIG. 2.
Figure 4:
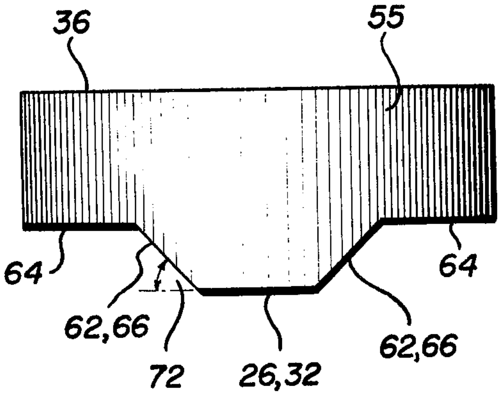
FIG. 4 is an elevational view as seen from right hand side of FIG. 3.

Turning now more particularly to FIGS. 2 – 4 it will be seen that the electrode 14 has a cylindrical outer surface 55 and a novel shaped transverse end that faces the electrode 12. In accordance therewith the novel transverse end has a valley structure in the form of opposed valley portions 56,56 which are of equal circumferential extent and extend between the plateau 30 and the support ridges 26,26. The valley portions 56,56 comprise a first pair of conically shaped walls 58,58 that are on opposite sides of the end surface 32 and which slope away therefrom toward the floor of the valley surface. The walls 58,58 end at the radially inner surfaces 60,60 of the ridges 26,26. The valley structure also comprises a second pair of walls 62,62 that are on opposite sides and spaced from end surface 32, the walls 62,62 being circumferentially intermediate the first pair of walls 58,58. As best seen in FIG. 2, the walls 62,62 are roughly triangular in shape and terminate short of the end surface 32. The valley structure is further provided with opposed flats 64,64 that are axially spaced from the end surface 32 (see FIGS. 3 and 4) and which are shaped like segments of a circle. Each wall 62 intersects the adjacent flat 64 whereby those two surfaces form obtuse angles. See FIG. 4.

It will thus be seen that the walls 62,62 each intersect the walls 58,58 to provide a valley structure that completely surrounds the end surface 32. In fabricating the electrode 14, the carbon may be molded into a shape that includes a central plateau 30 plus one conical surface (as at 58) extending 360° and with the ridges 26,26 also extending a full 360°. The electrode is then ground in two places to form the flats 64 and the walls 62 and also the inclined portions 66,66 leading circumferentially away from the ridges 26,26. The portions 66,66 are thus coplanar with the surfaces 62,62.

In a suitable electrode 14 the overall diameter of the surface 55 may be approximately 0.315 inches while the diameter of the surface 32 may be approximately 0.062 inches. The radial width of each ridge 26 is approximately 0.040 inches while the circumferential length thereof is approximately 0.070 inches. The angle 70 (FIG. 3) between the surface 32 and the conical wall 58 is approximately 30° whereas the angle 72 between the surface 32 and the wall 62 (assuming the latter extended thereto) is approximately 45°. Typically also the area of the end surface 32, which is the voltage discharge area, is within the range of 0.003019 square inches to 0.004778 square inches. The linear distance between opposite circumferential ends of each ridge 26 is approximately 0.78 inches. Typically, also, the total area for the two ridges 26,26 is from about 0.00511 square inches to about 0.00792 square inches.

The valley structure thus has walls shaped to provide a vent between the electrodes 12,14 and across the insulator end face 18 throughout the entire circumferential extent of the end face 18 except at opposed regions, namely ridges 26,26 that engage the end face 18.

The invention is claimed as follows:

1. In a surge arrester for providing overvoltage protection for a communications line or the like and which comprises a housing, a pair of spaced electrodes, insulating means surrounding a first of said electrodes and with a transverse end of said first electrode being recessed within said insulating means, the second of said electrodes having a part of a transverse end seated on said insulating means and presented toward said first electrode whereby an arc gap is provided that is determined by the extent of the recess of said first electrode within said insulating means, and means for retaining said electrodes and said insulating means in said housing; characterized by said second electrode having valley structure in said transverse end that opens toward said first electrode and with a single plateau only projecting from the floor of said valley structure, the end surface of the plateau being flat and forming one side of the arc gap and being symmetrical relative to the central axis of said second electrode, the valley structure having a first pair of walls that are on opposite sides of said end surface and which slope away therefrom toward the floor of the valley structure, a second pair of walls that are on opposite sides of and spaced from said end surface, said second pair of walls being respectively circumferentially intermediate the first pair of walls, said second electrode also having opposed flats axially spaced from said end surface and being joined respectively to said second pair of walls to form obtuse angles therebetween, the valley structure together with said second pair of walls and said flats constituting a region that completely surrounds said plateau and provides a vent across an end of said insulating means for particles that erupt from said electrodes into said arc gap, said part of said transverse end comprising spaced ridges which are small as compared to the peripheral extent of said second electrodes such that the vent is unobstructed throughout a major portion of said peripheral extent.

2. In a surge arrester according to claim 1, further characterized in that the walls of one pair form an angle to the end surface that is greater than the angle of the walls of the other pair with the end surface.

3. In a surge arrester according to claim 1 in which each wall of said second pair is flat and intersects the walls of said first pair, the walls of said first pair being conical.

4. In a surge arrester according to claim 3 in which said flats are segments of a circle.

5. In a surge arrester for providing overvoltage protection for a communications line or the like and which comprises a housing, a pair of spaced electrodes, insulating means surrounding a first of said electrodes and with a transverse end of said first electrode being recessed within said insulating means, the second of said electrodes having a transverse end seated on an end face of said insulating means and presented toward said first electrode whereby an arc gap is provided that is determined by the extent of the recess of said first electrode within said insulating means, and means for retaining said electrodes and said insulating means in said housing; characterized by said second electrode having valley structure in said transverse end that opens toward said first electrode and with a single plateau only projecting from the floor of said valley structure, the end surface of the plateau being flat and forming one side of the arc gap and being symmetrical relative to the central axis of said second electrode, the single plateau being entirely surrounded by valley structure.

6. In a surge arrester according to claim 5, said valley structure having walls shaped to provide a vent between said electrodes and across said end face throughout the entire circumferential extent of said end face except for opposed regions at which the second electrode engages said end face.

* * * * *